March 14, 1939. D. C. CROOM-JOHNSON 2,150,599
MEANS ADAPTED TO ENABLE AIRCRAFT TO PICK UP
WHILE IN FLIGHT ARTICLES OR PERSONS
Filed Sept. 10, 1935
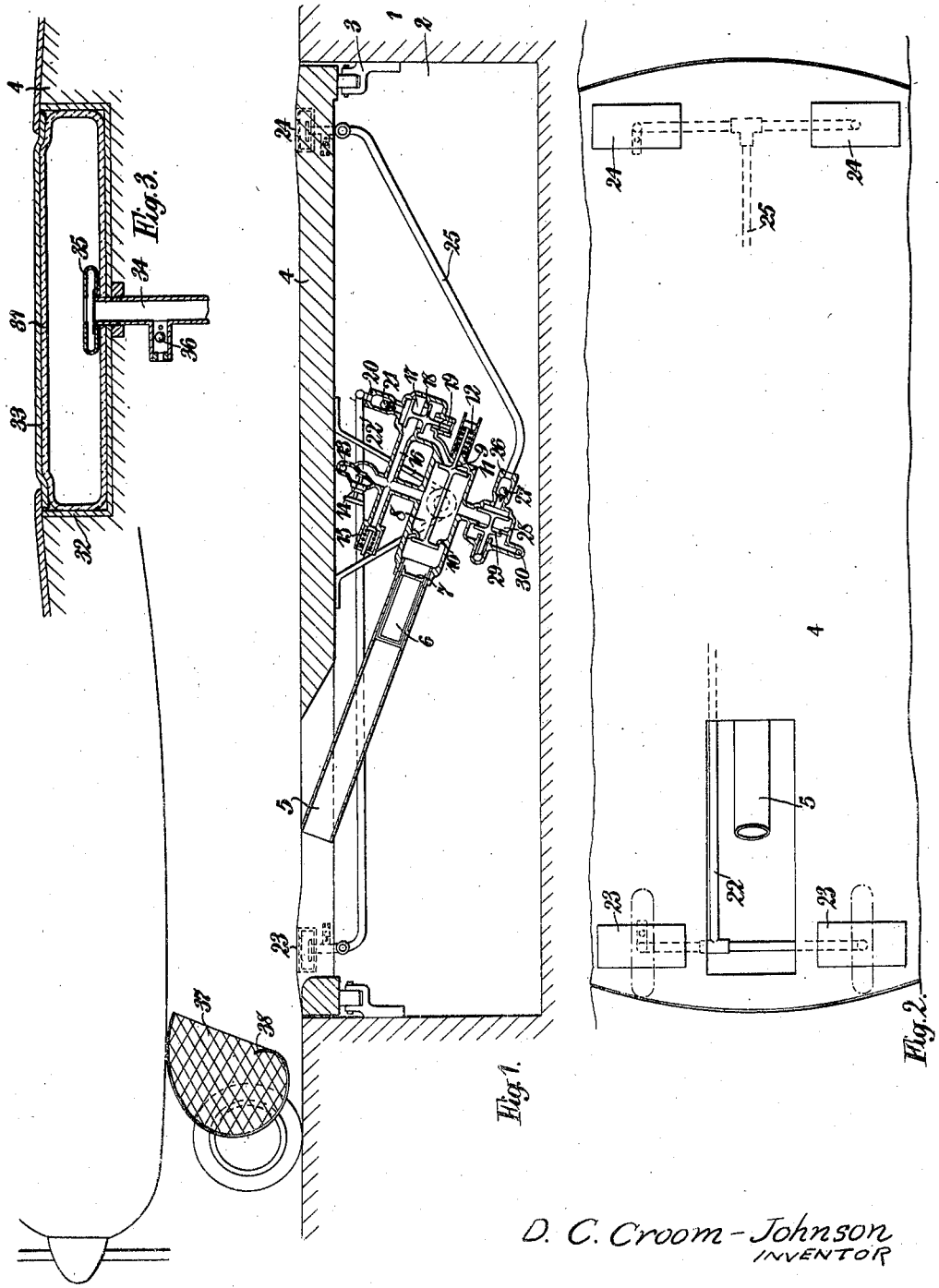
D. C. Croom-Johnson
INVENTOR
By: Glascock Downing & Seebold
Attys.

Patented Mar. 14, 1939

2,150,599

UNITED STATES PATENT OFFICE 2,150,599

MEANS ADAPTED TO ENABLE AIRCRAFT TO PICK UP WHILE IN FLIGHT ARTICLES OR PERSONS

Douglas Craig Croom-Johnson, Upper Warlingham, England

Application September 10, 1935, Serial No. 39,976
In Great Britain September 13, 1934

11 Claims. (Cl. 258—1)

This invention relates to means adapted to enable aircraft to pick up while in flight articles for instance packages or persons.

Proposals already made in this connection have involved the picking up of a package while it is stationary by an aircraft moving at or somewhat above its minimum speed of flight which may be taken as somewhere in the neighborhood of fifty miles per hour and in these circumstances it will be appreciated that the stresses set up are considerable and such as are liable to cause injury to the aircraft or even to cause the aircraft to crash.

The invention consists, broadly, in means for the purpose above referred to whereby the engagement of the article or person with a receptacle associated with the aircraft is secured when the package is moving at a speed suitably related with the speed of travel of the aircraft.

Thus, in accordance with the invention, the means may comprise mechanism adapted to propel the package or person at a speed suitably related with the speed of travel of the aircraft in the direction of travel of the latter and means on the aircraft in which the packet will be engaged while it is so propelled.

Preferably, in accordance with the invention, the mechanism in question is set into operation by the aircraft itself, to secure the propulsion of the article or person.

For propelling the article or person any suitable mechanism may be employed. For instance, mechanism of the character of a catapult or a spring gun or a gun in which compressed air or a charge of a propellant explosive and thus resembling a mortar may be used to discharge the article or person.

Generally, in accordance with the invention, the means for projecting the article or person will be located below a plane surface, for instance the surface of the ground, its axis being so directed relatively to the surface that when operated it will function to project the article or person to somewhat above the ground level and at a suitable speed in the direction of the line of travel of the cage associated with the aircraft.

Preferably in accordance with the invention the means may be so mounted or arranged that it may be brought into position to propel the article or person in the opposite sense to that in which wind is blowing, at the time, so that the aircraft may travel at its minimum speed relative to the ground when picking up.

Thus, for example, the means in question may be associated with a turntable or its equivalent.

The cage may be of any convenient form and may, for instance, be furnished with an opening in its rearward part furnished or not with a trap closure or the like.

In certain cases, for instance, the opening, when not furnished with a trap, may be arranged in the upper part of the cage, the lower part of which is formed with a lip which may be inturned and is adapted to prevent the article or person from accidental discharge from the cage.

Alternatively, the cage may be of a character adapted normally to be held in the opened out position and to be collapsed by impact of the article or person.

For use at night suitable illuminating means may be provided and generally guiding means or indicators may be associated with the propelling device for the assistance of the pilot of the aircraft in the control of its direction of flight.

Furthermore, means may be provided on the aircraft for further assisting in such control and the means in question may be an optical device of the nature, for instance, of a periscope adapted to enable the pilot to observe the ground immediately below the machine or in other words the normally blind spot.

The invention will be described further in detail with reference to the accompanying drawing, in which:—

Figure 1 is a view in sectional elevation showing a convenient construction of apparatus for projecting an article or person with the aeroplane in position to receive the projected article or person.

Figure 2 is a fragmentary plan view, and

Figure 3 is a view in sectional detail.

In Figure 1, 1 represents the ground of an aerodrome in which is formed a pit 2 of circular form having arranged therein a roller track 3, supporting a platform 4, in such manner that it may be rotated and thereby bring into position, to propel the article or person in the opposite sense to that in which the wind is blowing at the time, with what is in effect a gun or mortar actuated by compressed air. The gun or mortar comprises a barrel 5 in which the article, for instance a mail packet 6, having at its base a cup washer 7, may be introduced, the gun in the construction illustrated being muzzle loading.

In the rear of the gun barrel there is provided a chamber 8 adapted to contain a charge of compressed air. Within this chamber there is arranged a movable double headed valve element 9 co-operating with the seatings 10 and 11 and furnished with a spring 12 adapted normally to retain the valve in its retracted or closed position. Compressed air is supplied to the chamber by way of a pipe 13 with which is associated a stop valve 14 and a safety valve 15. From the compressed air supply pipe there extends a branch 16 connecting it with the valve chamber 17 in which a movable double headed valve element 18 associated with a cruciform guide 19 is arranged. The chamber in question is furnished with an extension 20 in which a non-return valve 21 is located and this extension is connected by means of the pipe 22 with two pneumatic trigger devices indicated generally in Figures 1 and 2 by the reference 23. The construction of these trigger devices 23 and of two other trigger devices 24 may be seen from Figure 3 and will be described subsequently. From the trigger devices 24 extends a pipe 25 to an extension 26 (in which is located a non-return valve 27) of the valve chamber 28 in which there is arranged a double headed valve element 29, functioning as a velocity control valve, adapted to place the chamber 8 in communication with the atmosphere by way of a calibrated orifice 30.

The construction of the two pairs of triggers is shown in detail in Figure 3, from which it will be seen that they each comprise a bag or sac 31 formed of rubber or the like located in a recess 32 provided in the platform, and protected by a movable plate 33. Into each of the bags or sacs opens a pipe 34 provided with a head or terminal portion 35 of the form indicated and in the pipe there is located a non-return valve 36. These trigger elements are connected in pairs as may be seen from the plan view in Figure 2 and the wheels of the landing carriage of the aeroplane will first pass over the trigger devices 24 and subsequently over the trigger devices 23 in order to effect propulsion of the package so that it may be received in the cage 37 provided with an incurved lip 38 which is located below the aeroplane.

The sequence of operations in using the device is as follows:—

The package 6 is inserted into the barrel 5 and pushed home into the position indicated in Figure 1. The movable double headed valve elements 9, 18 and 29 being closed by springs or gravity, compressed air enters the chambers in which the respective valve elements are located, at a point between the heads of the valves. Owing to the relative sizes of the heads of each of these three valves the difference in the total pressure operating upon their opposite ends results in a force parallel to the axes of the valves tending to keep the valves shut. This force increases with pressure.

When the pressure in the space between the two heads of the valves in the chamber 8 has reached a desired maximum the release valve 15 allows any further air to escape. The gun is now ready for action. An aeroplane carrying a cage 37, fixed to its under-side, taxis across the turntable along a white line parallel with the gun; the wheels of the landing carriage will first pass over the pneumatic trigger device 24 and compress the air therein, the compressed air thus raising the pressure upon the larger face of the movable valve element 29. This pressure overcomes the small force tending to keep the valve shut and the valve therefore opens, the non-return valve 27 then interrupting communication between the valve chamber and the pipe 25 and protecting the trigger device from damage while the air in the chamber 28 escapes to atmosphere through the calibrated orifice 30. This causes the pressure in the chamber 8 to be lowered at such a rate that the speed of the projected package on arrival at the cage on the aeroplane will always be greatly in excess of the speed of the aeroplane when it actuates the gun. Such actuation takes place in consequence of the wheels of the landing carriage passing over the trigger devices 23, the effect of which is to raise the air pressure in the rubber bags or sacs forming part of these devices. This increase in pressure is communicated to the valve 18 and compressed air enters behind the larger head of the valve 9, the smaller head of the valve 18 seating upon the cruciform guide. The effect is to raise the pressure operating upon the valve 9 to such a degree that the valve moves away from its seating 11 in opposition to the spring 12 with which may be associated a dashpot adapted to control the rate of opening of the valve and the main charge of air escaping from the chamber 8 expels the package 6 from the barrel. In this operation the non-return valves 36 associated with the trigger devices protects the rubber bags or sacs thereof from injury.

After the package has been expelled from the barrel the pressure in the system falls to atmospheric pressure owing to the constriction caused by the partly open valve 14. The movable valve elements 9, 18 and 29 then return to their initial position and the pressure again rises in the valve chambers until it reaches the pressure at which the relief or safety valve 15 opens. The gun is then ready for re-loading.

Should the aeroplane be off the white line far enough to cause the mail to miss the container, the triggers are so spaced with relation to the track of the aeroplane wheels that only one trigger of the pair will be operated. In this case the air will pass into the unoperated trigger and pressure will not be transmitted to the associated valve 28 or 18.

Generally it will be found preferable that the device which is associated with the aeroplane and is designed to receive the article, for instance a mail package or person, should be secured to the fuselage in such manner that the machine actually lands and taxis at a suitable speed along a straight white line and thereby actuates the trigger devices.

The trigger devices employed may be of widely varying character and when pneumatic triggers are employed instead of being arranged as above described, they may comprise lengths of rubber tubing, the air in which will be compressed by the wheels of the landing carriage of the aeroplane and in turn actuate the propelling mechanism.

The device provided on the aeroplane for receiving the projected package may be widely varied in structure, thus it may be a net or basket arranged under the aeroplane and preferably filling the space between the undercarriage struts and the wheel axle and fuselage.

Alternatively, the net or basket may be furnished as above described with an inturned lip.

It is to be understood that various other changes may be made in the details of construction and arrangement within the scope of the invention and particularly in the construction and arrangement of the means for projecting the article.

Furthermore, the projecting means employed may, in certain cases, generally resemble a catapult.

Having now described my invention, what I claim as new and desire to secure by Letters Patent is:—

1. Apparatus for enabling aircraft while in motion to pick up articles, comprising in combination, means adapted to propel an article into engagement with receiving means associated with the aircraft, means actuated by the passage of the aircraft in accordance with the speed thereof, means controlled by said last named means for varying the speed of propulsion of the article and means for predetermining the action of said speed varying means whereby the article will be propelled at a speed in excess of the speed of the aircraft.

2. Apparatus for enabling aircraft while in motion to pick up articles comprising in combination, means for propelling or projecting an article into engagement with receiving means associated with the aircraft, means actuated by the passage of the aircraft in accordance with the speed thereof, and means controlled by the said last named means for setting into operation the propelling or projecting means and for varying the force of projection thereof in accordance with the speed of the aircraft.

3. Apparatus enabling aircraft while in motion to pick up articles, comprising in combination means for propelling or projecting an article into engagement with receiving means associated with the aircraft and means spaced in relation to the direction of travel of the aircraft and adapted to be actuated in succession by the passage thereof for controlling the speed of propulsion of the article in accordance with the speed of the aircraft.

4. Apparatus enabling aircraft while in motion to pick up articles, comprising propulsion means for the article and means including spaced devices actuable by the passage of the aircraft for setting the propulsion means into operation and for controlling the force of propulsion in accordance with the speed of the aircraft.

5. Apparatus for propelling an article into engagement with receiving means associated with an aircraft, comprising means adapted to be actuated by the passage of the aircraft for controlling the force of projection, and means subsequently actuated by the passage of the aircraft to release the propelling mechanism to project the article at a speed dependent on the speed of the aircraft.

6. Apparatus for propelling an article into engagement with receiving means associated with an aircraft, comprising a compressed air gun for projecting the article, means adapted to be actuated by the passage of the aircraft for adjusting the pressure of the compressed air charge, and means subsequently actuable by the passage of the aircraft for releasing the charge to project the article, whereby the pressure of the charge and hence the velocity of propulsion is determined by the interval between the successive actuation of the said means.

7. Apparatus for propelling an article into engagement with receiving means associated with an aircraft, comprising a compressed air gun for projecting the article, a controllable leak for progressively reducing the pressure of the compressed air charge, means adapted to be actuated by passage of the aircraft for opening said leak and means subsequently actuable by the passage of the aircraft for releasing the charge to expel the article.

8. Apparatus for propelling an article into engagement with receiving means associated with an aircraft, comprising a pneumatic gun and means for supplying compressed air thereto, a main valve for controlling the release of the compressed air charge from a chamber communicating with the supply and arranged to be held in closed position by the air pressure thereon, a second valve controlling a calibrated leak orifice communicating with the chamber and arranged to be opened by actuation of a device by the passage of the aircraft, and a third valve arranged to be opened subsequently by actuation of a device by the passage of the aircraft to admit compressed air behind the said main valve to force the latter from its seat to release the charge and expel the article.

9. Apparatus according to claim 8 wherein said second and third valves are arranged to be held in closed position by the air pressure thereon and are adapted to be opened by means operated by the passage of the aircraft.

10. Apparatus enabling aircraft while in motion to pick up articles, comprising mechanism adapted to propel an article into engagement with receiving means associated with an aircraft, and spaced elements positioned approximately at the level of a substantially plane surface and actuable in succession by the wheels or their equivalent of a structure associated with the aircraft passing thereover, one of said elements being adapted to control the force of projection of the article and the other and subsequently actuated element releasing the mechanism to project the article into engagement with the receiving means.

11. Apparatus enabling aircraft while in motion to pick up articles, comprising propelling mechanism disposed below ground level, spaced elements arranged at approximately ground level to be actuated in succession by the passage of an aircraft thereover, means operated by one of said elements for adjusting the propulsive force of the said mechanism and means operated by the second of said elements to release the mechanism and expel the article at a speed suitably related to and determined by the speed of the aircraft.

DOUGLAS CRAIG CROOM-JOHNSON.